(12) United States Patent
Pautsch et al.

(10) Patent No.: US 10,072,698 B2
(45) Date of Patent: Sep. 11, 2018

(54) LOAD-BEARING COMPONENT FOR THE FASTENING, LASHING, AND/OR LIFTING TECHNOLOGY WITH A PLASTIC-METAL COMPOSITE SYSTEM

(71) Applicant: RUD Ketten Rieger & Dietz GmbH u. Co. KG, Aalen (DE)

(72) Inventors: Ingo Pautsch, Bopfingen-Oberdorf (DE); Sebastian Spitzer, Dresden (DE); Felix Dehmel, Dresden (DE)

(73) Assignee: RUD Ketten Rieger & Dietz GmbH u. Co. KG, Aalen (DE)

( * ) Notice: Subject to any disclaimer, the term of this patent is extended or adjusted under 35 U.S.C. 154(b) by 0 days.

(21) Appl. No.: 15/438,352

(22) Filed: Feb. 21, 2017

(65) Prior Publication Data
US 2017/0241469 A1     Aug. 24, 2017

(30) Foreign Application Priority Data
Feb. 23, 2016   (DE) .................... 10 2016 202 782

(51) Int. Cl.
*F16M 11/00*     (2006.01)
*F16B 45/00*     (2006.01)
(Continued)

(52) U.S. Cl.
CPC .............. *F16B 45/00* (2013.01); *F16G 15/06* (2013.01); *F16G 15/12* (2013.01)

(58) Field of Classification Search
CPC ......... F16B 15/06; F16B 45/025; F16B 45/00
See application file for complete search history.

(56) References Cited

U.S. PATENT DOCUMENTS 2,709,616 A * 5/1955 Larson .................... F16G 15/06
                                                      24/115 R
3,056,167 A   10/1962 Knoppel
(Continued)

FOREIGN PATENT DOCUMENTS

CN      1141615      1/1997
CN    103299185      9/2013
(Continued)

OTHER PUBLICATIONS

German Search Report, dated Jan. 2017.
Extended Search Report dated Jul. 11, 2017 in European Patent No. EP 17 15 6523.

*Primary Examiner* — Amy J. Sterling
(74) *Attorney, Agent, or Firm* — Barnes & Thornburg LLP; Jeffrey R. Stone

(57) ABSTRACT

The invention relates to a load-bearing component (1) for the fastening, lashing, and/or lifting technology, such as a shackle, a snap hook, a hook, or a ring link. The component (1) comprises a plastic-metal composite system (4) which forms at least one load-bearing section (2) and at least one connection section (3). The load-bearing section (2) serves to fasten and/or suspend a load, for example, by use of a fastening device. The component (1) can with the aid of the connection section (3) be attached to an object, for example, to a load or a further component (1). In order to design the component (1) as light as possible while having a high load-bearing capacity, its is according to the invention provided the plastic-metal composite system (4) comprises a core (5) made of fiber-plastic composite (16) extending continuously from the load-bearing section (2) to the connection section (3) and comprising at least one outer shell (8) made of metal material and disposed on the load-bearing section (2) and/or the connection section (3). The outer shell (Continued)

(8) serves to transfer a force acting from the outside upon the component (1) across a large surface to core (5).

14 Claims, 3 Drawing Sheets

(51) Int. Cl.
    *F16G 15/06*     (2006.01)
    *F16G 15/12*     (2006.01)

(56) References Cited

U.S. PATENT DOCUMENTS

| | | | | |
|---|---|---|---|---|
| 4,561,272 A | * | 12/1985 | Goldstein | E05B 15/1614 |
| | | | | 428/627 |
| 6,282,879 B1 | * | 9/2001 | Bonaiti | F16G 15/06 |
| | | | | 59/86 |
| 8,756,955 B2 | * | 6/2014 | Walchle | F16B 45/00 |
| | | | | 24/573.11 |
| 9,856,905 B2 | * | 1/2018 | Servais | F16B 45/025 |
| 2006/0218756 A1 | | 10/2006 | Branca | |
| 2008/0256991 A1 | * | 10/2008 | Goldman | E05B 39/00 |
| | | | | 70/57.1 |
| 2011/0068076 A1 | | 3/2011 | Schmidt et al. | |
| 2015/0231423 A1 | | 8/2015 | Perner | |

FOREIGN PATENT DOCUMENTS

| | | |
|---|---|---|
| DE | 1258056 | 10/1963 |
| DE | 102008013203 A1 | 9/2009 |
| DE | 102014200153 A1 | 7/2015 |
| EP | 2039959 A1 | 3/2009 |
| WO | 2004106772 A2 | 12/2004 |
| WO | WO2009037107 A1 | 3/2009 |
| WO | WO2015105509 A1 | 7/2015 |

\* cited by examiner

LOAD-BEARING COMPONENT FOR THE FASTENING, LASHING, AND/OR LIFTING TECHNOLOGY WITH A PLASTIC-METAL COMPOSITE SYSTEM

The invention relates to a load-bearing component for the fastening, lashing, and/or lifting technology comprising a plastic-metal composite system which forms at least one load-bearing section for fastening and/or suspending a load and at least one connection section for fastening the component to a further object.

Such a load-bearing component can be designed in the form of a shackle, a ring, a hook or in the form of a chain link, ring link or an eye.

A load-bearing hook with a plastic-metal composite system is known from the prior from DE 20 2014 104 023 U1. The load-bearing hook has an inner body made of metal material which is at least in sections covered with plastic material. The inner body is there a flat truss body which is cut out of a metal blank and is coupled to a plastic body engaging through the truss structure.

Although a reduced dead weight as compared to conventional load-bearing hooks made of steel is already given with a load-bearing hook of this type, it is desirable to further reduce the component mass while maintaining the load-bearing capacity.

This object is satisfied by way of the component mentioned above in that the plastic-metal composite system comprises a core made of a fiber-plastic composite extending continuously from the load-bearing section to the connection section and forming a support structure and at least one outer shell made of metal material and disposed on the load-bearing section and/or the connection section.

The components according to the invention are characterized by particularly low weight and a high load-bearing capacity in relation to the weight. The core as a support structure transmits the loads from the load-bearing section to the connection section. The outer shell on the load-bearing section and/or the connection section being made of metal material prevents the contact pressure per unit area from being too high when a force is introduced from the fastening mechanism into the component and/or when the force is introduced into the further object. The outer shell distributes the force to a larger area from where it is then transferred to the core.

The solution according to the invention can be further improved by the further developments that are advantageous on their own and can be combined at random.

The core can for further reducing the weight of the component form the surface of the component at the sections that are not covered by the at least one outer shell. Alternatively, an outer shell made of plastic material that differs from that of the core can also be provided at the sections of the component that are not covered by the metal outer shell. Such an outer covering is preferably also part of the fiber-plastic composite. The outer covering can, for example, be composed of highly elastic shock-absorbing material and, for example, form a rubber reinforcement. The outer covering can alternatively or cumulatively at least in sections also be made of materials exhibiting particular corrosion resistance when the component is used in corrosive environments.

According to a further advantageous configuration, at least one element determining the fiber direction can be disposed in the core of the plastic-metal composite system. The element determining the fiber direction serves to ensure the intended fiber orientation during the manufacturing process, the position of the preform, or position stabilization of pre-impregnated fiber layers, so-called prepregs, and to thereby obtain a fiber orientation which is optimal for the load situation. The elements determining the fiber direction can there in particular in their outer contour follow the stress pattern in the core. The fibers are in the vicinity of the element determining the fiber direction in particular tangential to its surface.

The element determining the fiber direction can in particular be tapered or wedge-shaped. It is preferably disposed where the material thickness of the core is increased relative to adjacent sections of the core or where a loop connection of the fiber-plastic composite to a metal load-bearing element is provided. There is a risk at these thickened points during manufacture that the intended fiber orientation is undefined, which could lead to entanglement of the fibers and thereby to only incomplete utilization of the fiber strength.

The element determining the fiber direction can in the core in particular extend away from a cylindrical opening of the component. It is in such a configuration advantageous if the base of a wedge-shaped element is arranged at the cylindrical opening and the tip of the wedge-shaped element points away from the cylindrical opening. Such a cylindrical opening can be, for example, a passage opening of the load-bearing section and/or the connection section. The element determining the fiber direction can at this point provide for a defined direction of flow and fiber orientation around the cylindrical element and thereby ensure a homogeneously curved loop attachment.

The outer shell can according to a further advantageous embodiment line a cylindrical opening of the component, at least in sections. As a result, the inner wall of the cylindrical opening can be loaded by an object disposed therein without damage to the fiber-plastic composite of the core.

Such an outer shell can, for example, form a flange portion around the cylindrical opening which is more resilient to high surface pressures.

Electronic components can be integrated into the core. These electronic components can in particular be insert-molded or infiltrated thereon, i.e. they are firmly entrapped into the core when the fiber-plastic composite cures. The electronic components can be data transmission devices, sensors, for example, for detecting at least one operating parameter such as a load state, the temperature and/or for detecting an operating state, such as the closure of a hook, a snap hook or a shackle. The electronic components can also comprise contactlessly readable memories with which such operating parameters and/or states as well as parameters for component identification and/or maintenance thereof are stored, preferably in an updatable manner. Since the electronic components are firmly embedded in the core when the fiber-plastic composite cures, they are later not accessible from the exterior of the component. This can prevent manipulation of the electronic components.

The load-bearing section can be formed to be bow-shaped, where an inner surface of the load-bearing section is formed by the outer shell. A bow-shaped load-bearing section is found, for example, in shackles, snap hooks, hooks, chain or ring links and eyes. Resting on the inner surface is a connection component or a limp fastening, lifting or lashing device such as, for example, a rope or a belt. The outer shell on the inner surface is to reduce wear on the inner surface and to distribute the force over a larger area to the core.

In order for the fastening, lifting or lashing device to be able to move along the load-bearing section to follow different directions of force, it is of advantage to have the outer shell extend in the longitudinal direction of the bow-shaped load-bearing section for more than one semicircular arc, i.e. for more than 180°.

A particularly load-bearing component results when the fiber-plastic composite comprises continuous fibers. The continuous fibers can in particular be looped around a cylindrical opening or several openings of the component. The at least one looped opening is in such a configuration located within the section enclosed by the continuous fiber. The openings can be part of the load-bearing section, for example, for ring links, chain links, eyes, or fastening points with eyes. Such openings can at the connection section serve, for example, to receive a support or locking bolt or a closure or a catch.

In the following, the invention is explained by way of example using embodiments with reference to the drawings. In accordance with the above explanations, individual elements of the respective embodiment can there be omitted or added to the respective embodiment, depending on whether this element is necessary for a particular application. In the figures, the same reference symbols are for the sake of simplicity used for elements which correspond to one another in terms of function and/or structure, where:

First the mode of operation and the structure of component 1 according to the invention for the fastening, lashing, and/or lifting technology for bearing load shall be described. Load-bearing component 1 can be a shackle, a hook, a ring link, a chain link, a fastening point, a tensioning device for belts, ropes or chains or a snap hook, to mention only a few components of the fastening, lashing, and/or lifting technology.

Figure 2:
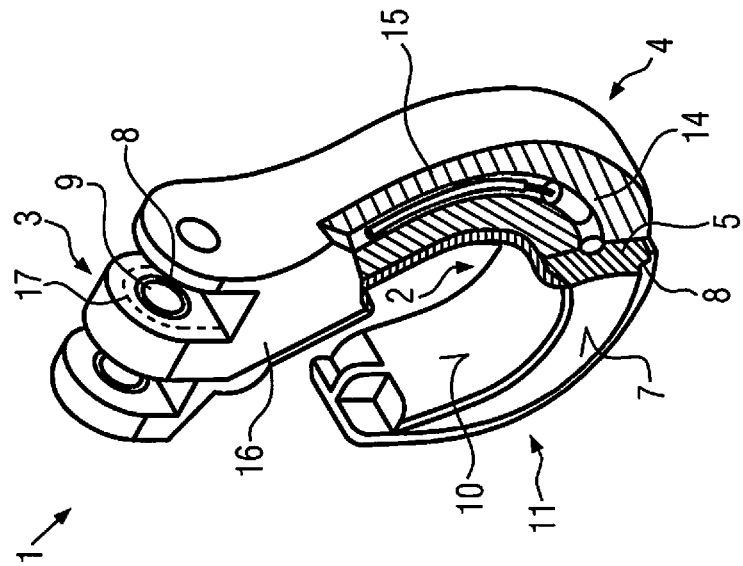
FIG. 2 shows a schematic perspective view of the partially cut-away component of FIG. 1.
Figure 1:
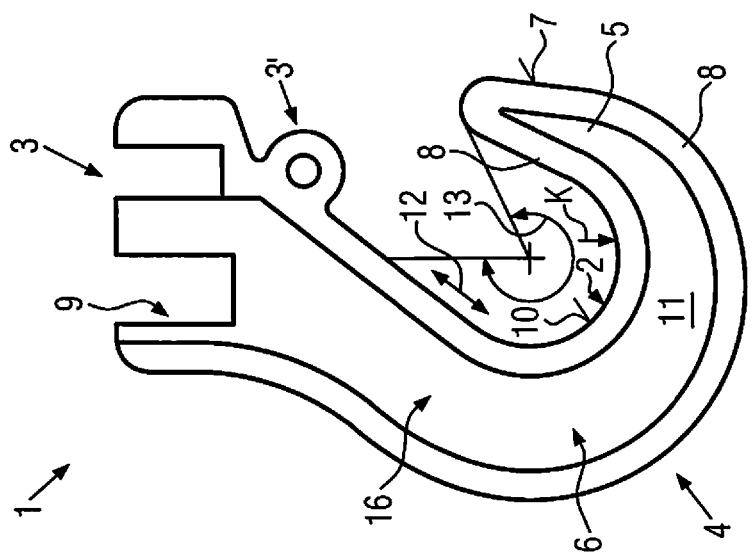
FIG. 1 shows a schematic side view of a component according to the invention.

The component is in FIGS. 1 and 2 only by way of example shown as a hook.

Component 1 comprises a load-bearing section 2 to which a load is fastened and/or hooked by way of a fastening device (not shown).

Component 1 further comprises a connection section 3 which serves to attach the component to a further object.

Component 1 can comprise several load-bearing sections 2 as well as several connection sections 3. For example, it can as a hook comprise a further connection section 3' for attaching a hook latch or a safety catch for the hook mouth.

The component comprises a plastic-metal composite system 4. In this composite system, at least one plastic element and at least one metal element are combined and processed together in order to obtain properties which the individual components of the composite system do not have when considering each one individually.

The plastic-metal composite system 4 has a core 5 which can in part form the outer surface of component 1. The core itself is made of a fiber-plastic composite and forms a support structure 6 which transmits a force 7 acting upon load-bearing section 2 to connection section 3. It is from connection section 3 introduced into the object attached there. The direction of the distribution of forces can also change.

Core 5, at least in sections, forms an outer surface 7 of component 1. In order to protect core 5, it can externally be coated with shock-absorbing material which differs from the material of the core. This outer covering (not shown) can be part of the fiber-plastic composite. For example, the core can at least in sections be surrounded with an elastic rubber-like covering so that any impact can not damage component 1 or core 5. The use of component 1 in certain corrosive environments can also require coating core 5 with a protective layer made of a layer which is corrosion-resistant in this environment. Such a layer can be part of the fiber-plastic composite.

Plastic-metal composite system 4 further comprises at least one outer shell 8 which is located at least on load-bearing section 2 and/or on connection section 3 and there forms outer surface 7 of component 1. Outer shell 8 is made of metal material.

Load-bearing section 2 and/or connection section 3 can comprise at least one cylindrical opening 9 which is at least in sections lined by outer shell 8.

Outer shell 8 serves to receive a force 7 acting from the outside on component 1 and to transfer it across a larger surface to core 5. At the same time, outer shell 8 is to provide greater wear resistance against impact and abrasion.

When load-bearing section 2 is of an approximately bow-shaped design, as in the case with a hook, outer shell 8 can at least in sections form inner surface 10 of the load-bearing section.

Outer shell 8 can extend at least in sections over side surfaces 11 of component 1 that adjoin the inner surface. In order to better protect core 5 at this point, the latter can recede somewhat with respect to outer shell 8, for example, by way of a groove, so that a fastening device which is hooked to load-bearing section 2 can not contact the core.

On inner surface 10 of load-bearing section 2, outer shell 8 can in the former's longitudinal direction 12 extend over a section 13 that occupies more than one semicircular arc, i.e., more than 180°.

In section 14 of FIG. 2 which is shown broken away and reveals a view onto the interior of core 5, it can be seen that electronic components 15 can be embedded in core 5. These electronic components can comprise RFID elements, sensors, memories and the like in order to be able to record and remotely query operating conditions of the sensor. Furthermore, identifiers which identify the component and its maintenance state can also be integrated into the electronic components.

Fiber-plastic composite 16 of core 5 preferably comprises continuous fibers which are shown schematically in FIG. 2 only by way of a single continuous fiber 17. At least some of continuous fibers 17 surround a cylindrical opening 9 of component 1 in order to increase the load-bearing capacity.

Figure 3:
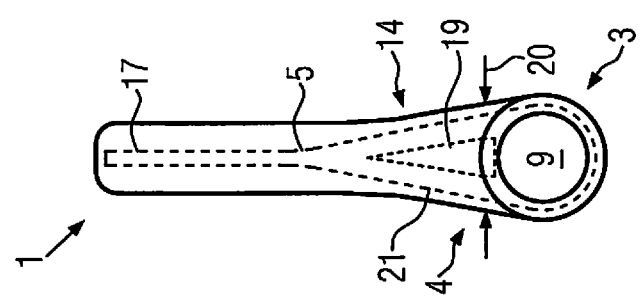
FIG. 3 shows a schematic side view of a further component according to the invention.
Figure 4:
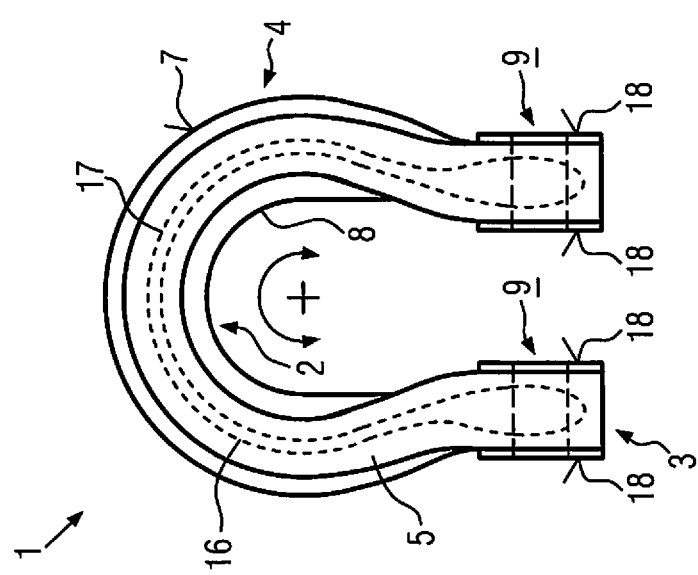
FIG. 4 shows a schematic front view of the component of FIG. 3.
Figure 5:
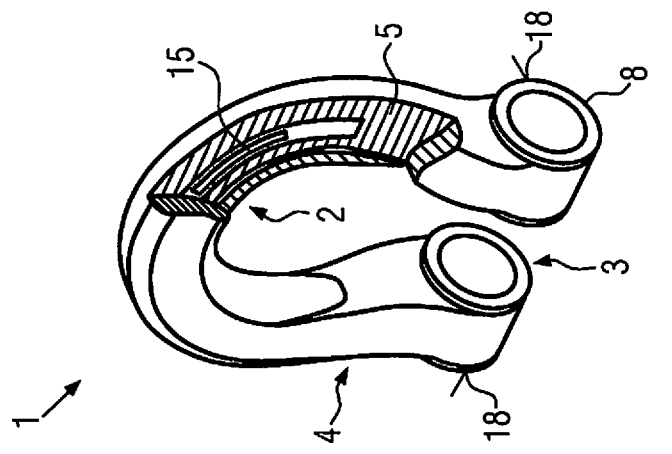
FIG. 5 shows a schematic perspective view of the partially cut-away component of FIGS. 3 and 4.

As shown in FIGS. 3 to 5, component 1 can, as described above, also be configured as a shackle. With a shackle, connection section 3 receives the locking pin (not shown) as a further object. Cylindrical openings 9 are each lined with a separate outer shell 8 on the inner side which also forms a flange portion 18 on the face sides of cylindrical openings 9 in order to avoid damage to core 5 from large surface pressure.

It can be seen in section 14 partly broken away that at least one element 19 determining the fiber direction can also be embedded in core 5. Element 19 determining the fiber direction is preferably disposed in a section 20 in which the material thickness 21 of the core is greatly increased with respect to adjacent sections. In such thickened section 20, the risk is given during the production of the fiber-plastic composite 16 or of the entire plastic-metal composite system 4, respectively, that the flow direction of the plastic material with the fibers is undetermined. This can lead to entanglement of the fibers, due to which the load-bearing capacity of the fiber-plastic composite can not be optimally utilized. In order to align the fiber direction 22 in a manner appropriate for the load during production, element 19 determining the fiber direction is arranged in at least one section 20 with an increase in material thickness 21. Such a section 20 is, for example, located at or adjacent to a cylindrical opening 9.

Element 19 determining the fiber direction can be tapered or wedge-shaped, where it is tapered in the direction away from section 20 having the larger material thickness 21. The base of such a wedge-shaped element 11 is preferably located at a cylindrical opening 9.

When using continuous fibers 17, they can for a bow-shaped load-bearing section 2 or connection section 3 be laid in a loop-shaped manner around the two cylindrical openings 9, as is indicated in FIGS. 3 and 4.

Figure 6:
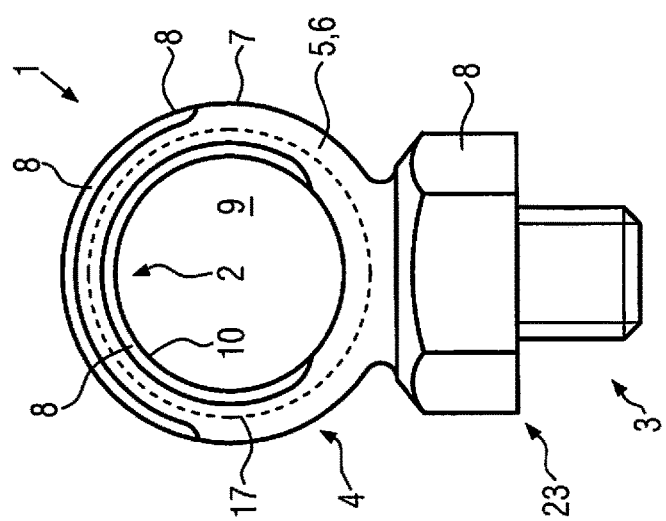
FIG. 6 shows a schematic side view of a further component according to the invention.

Component 1 can also be configured as a fastening point, as shown in FIG. 6. Outer shell 8 can be located in the region of connection section 3 with which the fastening point is attached to an object, for example, a load to be lifted. In this case, load-bearing section 2 has a cylindrical opening 9 in the form of an eye, through which a fastening device (not shown) for lifting the load must be threaded. Inner surface 10 of the load-bearing section is likewise provided with an outer shell 8.

A further outer shell 8 can be located on outer surface 11 of load-bearing section 2 in order to prevent damage to core 5 in the event of impacts.

Outer shell 8 is also disposed where tools are used on component 1, for example, on a portion forming a screw head 23.

Figure 7:
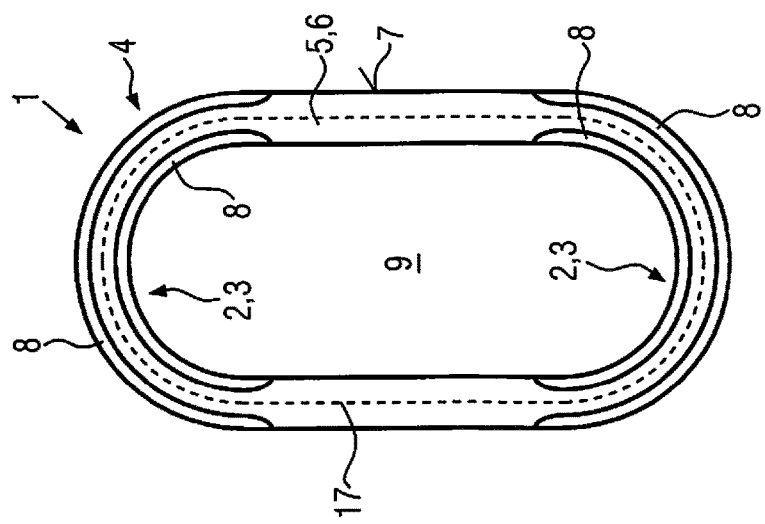
FIG. 7 shows a schematic side view of a further component according to the invention.

As FIG. 7 finally shows, component 1 can also be a ring link for which load-bearing section 2 and connection section 3 are configured identically.

REFERENCE NUMERALS 1 load-bearing component for the fastening, lashing, and/or lifting technology
2 load-bearing section
3 connection section
3' further connection section
4 plastic-metal composite system
5 core
6 support structure
7 outer surface
8 outer shell
9 cylindrical opening
10 inner surface
11 side surface
12 longitudinal direction
13 section of the core covered by outer shell
14 section illustrated broken away
15 electronic component
16 fiber-plastic composite
17 continuous fiber
18 flange portion
19 element determining the fiber direction
20 section with increased material thickness
21 material thickness
22 fiber direction
23 screw head
K force

The invention claimed is:

1. Load-bearing component for the fastening, lashing, and/or lifting technology for receiving loads, comprising a plastic-metal composite system which forms at least one load-bearing section for fastening or suspending a load or a fastening device and at least one connection section for attaching an object to said component characterized in that said plastic-metal composite system comprises a core made of a fiber-plastic composite extending continuously from said load-bearing section to said connection section and forming a support structure and at least one outer shell made of metal material and disposed on said load-bearing section or said connection section, characterized in that at least one element determining a fiber direction is disposed in said core of said plastic-metal composite system, wherein said element determining the fiber direction is configured to be tapered or wedge shaped.

2. Load-bearing component according to claim 1, characterized in that said core forms an outer surface of said component at the sections that are not covered by said at least one outer shell.

3. Load-bearing component according to claim 1, characterized in that said element determining the fiber direction is disposed in a section in which the material thickness of said fiber-plastic composite is increased as compared to the vicinity.

4. Load-bearing component according to claim 1, characterized in that said element determining the fiber direction is disposed at a cylindrical opening of said component.

5. Load-bearing component according to claim 4, characterized in that said element determining the fiber direction is tapered in the direction away from said cylindrical opening.

6. Load-bearing component according to claim 1, characterized in that said outer shell lines a cylindrical opening of said component, at least in sections.

7. Load-bearing component according to claim 1, characterized in that at least one electronic component is embedded in said core.

8. Load-bearing component according to claim 1, characterized in that said load-bearing section is configured to be bow-shaped and an inner surface of said load-bearing section is formed by said outer shell.

9. Load-bearing component according to claim 8, characterized in that said outer shell extends at least in sections over said side surfaces of said load-bearing section that adjoin said inner surface.

10. Load-bearing component according to claim 8, characterized in that said outer shell extends in the longitudinal direction of said load-bearing section for more than 180°.

11. Load-bearing component according to claim 1, characterized in that said at least one outer shell forms a flange surface at a cylindrical opening.

12. Load-bearing component according to claim 1, characterized in that said fiber-plastic composite comprises continuous fibers.

13. Load-bearing component according to claim 12, characterized in that at least some of said continuous fibers loop around at least one cylindrical opening of said component.

14. A load-bearing component for the fastening, lashing, or lifting technology for receiving loads, comprising a plastic-metal composite system which forms at least one load-bearing section for fastening or suspending a load or a fastening device and at least one connection section for attaching an object to said component characterized in that said plastic-metal composite system comprises a core comprising a fiber-plastic composite extending continuously from said load-bearing section to said connection section and forming a support structure and at least one outer shell made of metal material and disposed on said load-bearing section or said connection section, wherein the core comprising the fiber-plastic component forms surface of the load- bearing component not covered by the at least one outer shell.

\* \* \* \* \*